(12) United States Patent
Sändig

(10) Patent No.: US 11,353,583 B2
(45) Date of Patent: Jun. 7, 2022

(54) OPTICAL POSITION-MEASUREMENT DEVICE WITH VARYING FOCAL LENGTH ALONG A TRANSVERSE DIRECTION

(71) Applicant: DR. JOHANNES HEIDENHAIN GmbH, Traunreut (DE)

(72) Inventor: Karsten Sändig, Palling (DE)

(73) Assignee: DR. JOHANNES HEIDENHAIN GmbH, Traunreut (DE)

( * ) Notice: Subject to any disclaimer, the term of this patent is extended or adjusted under 35 U.S.C. 154(b) by 62 days.

(21) Appl. No.: 17/104,258

(22) Filed: Nov. 25, 2020

(65) Prior Publication Data

US 2021/0173080 A1    Jun. 10, 2021

(30) Foreign Application Priority Data

Dec. 9, 2019    (DE) .......................... 102019219151.7

(51) Int. Cl.
    *G01S 17/06*      (2006.01)
    *G01D 5/245*      (2006.01)
    (Continued)

(52) U.S. Cl.
    CPC ............ *G01S 17/06* (2013.01); *G01D 5/2457* (2013.01); *G01D 5/38* (2013.01); *G01S 7/481* (2013.01)

(58) Field of Classification Search
    CPC ....... G01S 17/06; G01S 7/481; G01D 5/2457; G01D 5/38; G01D 5/34792; G01D 5/34715; G01B 11/02
    See application file for complete search history.

(56) References Cited

U.S. PATENT DOCUMENTS 6,392,224 B1    5/2002    Holzapfel et al.
7,714,273 B2    5/2010    Saendig
(Continued)

FOREIGN PATENT DOCUMENTS

DE    102007035345 A1    5/2008
EP    0896206 A2    2/1999
EP    1867960 A1    12/2007

OTHER PUBLICATIONS

European Search Report issued in corresponding European Patent Application No. 20210902.1, dated Apr. 13, 2021, pp. 1-2.

*Primary Examiner* — Hwa Andrew Lee
(74) *Attorney, Agent, or Firm* — Carter DeLuca & Farrell LLP

(57) ABSTRACT

An optical position-measurement device includes a reflection measuring standard and a scanning unit, which is movable in relation thereto in at least one measurement direction. The reflection measuring standard has an incremental measuring graduation and a reference marking in at least one reference position. In addition to scanning device (s) for the incremental signal generation, the scanning unit includes for the reference signal generation at least one light source, imaging optics, a diaphragm structure arranged in a diaphragm plane, and a plurality of detector elements. Via the imaging optics, imaging of the reference marking onto the diaphragm structure is implemented. The reference marking is provided on the reflection measuring standard and is integrated into the incremental measuring graduation. In addition, the imaging optics has a variable, object-side focal length along a transversal direction oriented perpendicular to the measurement direction.

17 Claims, 9 Drawing Sheets

(51) Int. Cl.
*G01D 5/38* (2006.01)
*G01S 7/481* (2006.01)

(56) References Cited

U.S. PATENT DOCUMENTS

| | | |
|---|---|---|
| 2007/0271805 A1 | 11/2007 | Holzapfel |
| 2008/0117440 A1 | 5/2008 | Saendig |
| 2020/0025591 A1* | 1/2020 | Hermann ........... G01D 5/34715 |

* cited by examiner

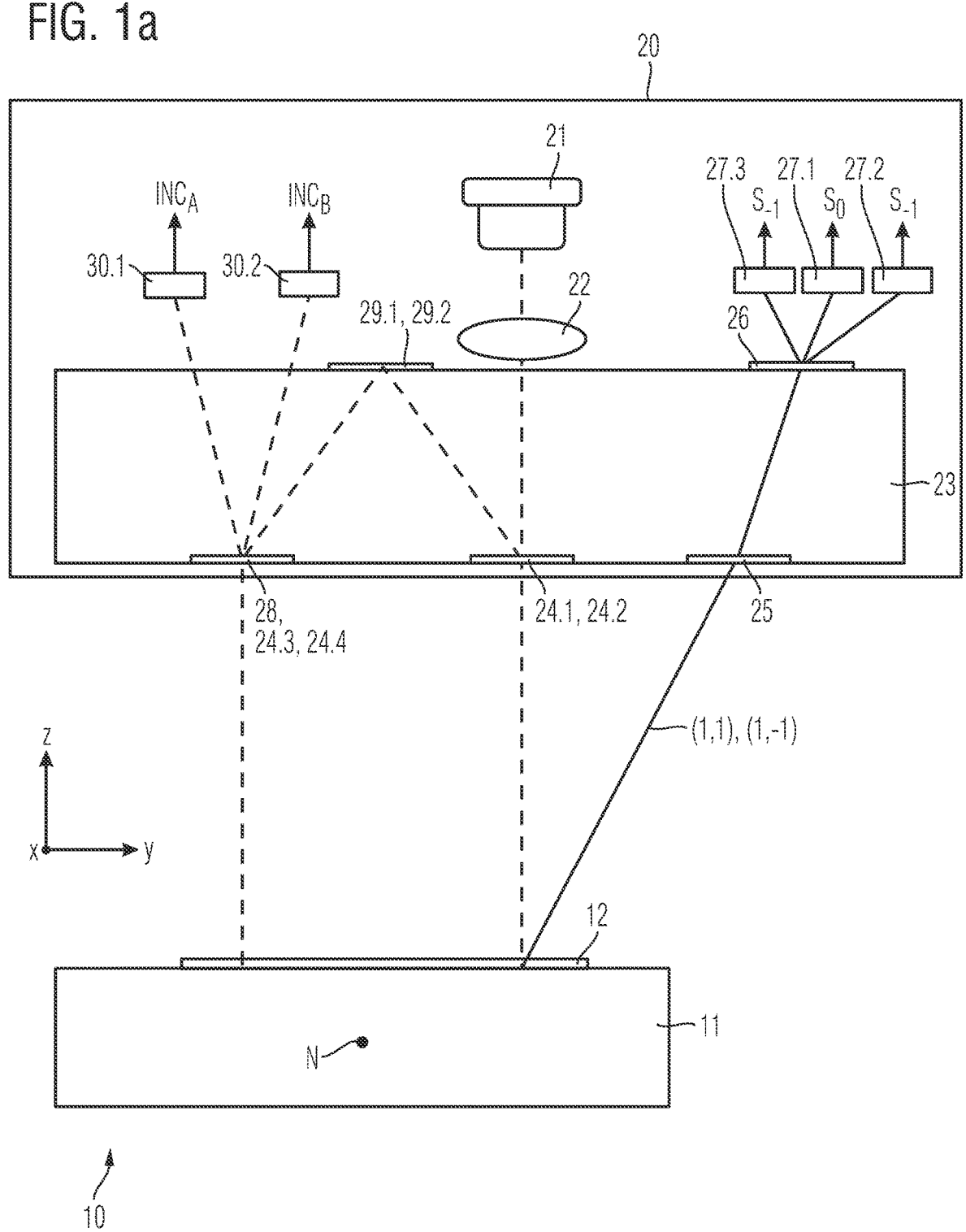

25
25.1 25.2

26.3 26.2 26.1

26

$S_{-1}$ $S_0$ $S_1$

OPTICAL POSITION-MEASUREMENT DEVICE WITH VARYING FOCAL LENGTH ALONG A TRANSVERSE DIRECTION

CROSS-REFERENCE TO RELATED APPLICATIONS

The present application claims priority to Application No. 10 2019 219 151.7, filed in the Federal Republic of Germany on Dec. 9, 2019, which is expressly incorporated herein in its entirety by reference thereto.

FIELD OF THE INVENTION

The present invention relates to an optical position-measurement device.

BACKGROUND INFORMATION

In addition to periodic incremental signals regarding the relative offset of two objects that are movable relative to one another, certain conventional position measuring devices also supply so-called reference signals. Via the reference signals, it is possible to establish an exact absolute reference with regard to the position of the two objects that are movable relative to one another at predefined reference positions along the measuring track. The usually considerably higher resolution incremental measurement is subsequently related to the determined absolute position. A number of possibilities for generating reference signals are conventional.

For example, German Published Patent Application No. 10 2007 035 345 and U.S. Patent Application Publication No. 2008/0117440 describe that, in order to generate reference signals, diffractive reference marking structures are placed between two incremental tracks on the measuring standard at the reference position. The scanning of the reference marking provides a corresponding reference signal at the respective position. In particular in the case of high-resolution optical position measuring devices operated using incident light, certain requirements result with regard to the generation of the reference signals. For example, even if tilting of the scanning unit and the reflection measuring standard occurs, e.g., as a consequence of a less than optimal mounting of these components, no position error should result if at all possible. This applies both to the generation of the incremental signals and the generation of the reference signals. To address this issue, the foregoing documents propose providing in the corresponding position measuring device the same behavior in response to tilting of the scanning unit and the reflection measuring standard for the generation of the incremental signals and also the generation of the reference signals. For both scans, suitable measures provide that the so-called neutral pivot points of the respective scans coincide. The neutral pivot point of the respective scan is understood to denote the particular point about which tilting of the scanning unit and the reflection measuring standard may occur without resulting in a position error. However, especially with large changes in the scanning distance, i.e., the distance between the scanning unit and the reflection measuring standard, the coinciding of the neutral pivot points of the two scans is not always able to be reliably ensured.

SUMMARY

Example embodiments of the present invention provide an optical position-measurement device for an incident light operation in which little interference occurs in the generation of reference signals by possible tilting between the scanning unit and the reflection measuring standard even in the presence of large fluctuations in the scanning distance.

According to an example embodiment of the present invention, an optical position-measurement device includes a reflection measuring standard and a scanning unit, which is movable thereto in at least one measurement direction. The reflection measuring standard has an incremental measuring graduation as well as a reference marking in at least one reference position. In addition to a scanning device for the incremental signal generation, the scanning unit includes, for the reference signal generation, at least one light source, imaging optics, a diaphragm structure situated in a diaphragm plane, and a plurality of detector elements, an imaging of the reference marking onto the diaphragm structure being implemented via the imaging optics. The reference marking is arranged on the reflection measuring standard and is integrated into the incremental measuring graduation. The imaging optics has a variable focal length on the object side along a transversal direction oriented perpendicular to the measurement direction.

The object-side focal lengths of the imaging optics are selected, for example, such that the object-side focal length is located in the plane of the neutral pivot point of the incremental scanning for every scanning distance between the scanning unit and the reflection measuring standard, the neutral pivot point of the incremental scanning corresponding to the particular point about which tilting of the scanning unit or the reflection measuring standard is possible without resulting in a position error in the generated incremental signals.

In the reflection measuring standard, the neutral pivot point of the incremental scanning may be located on the particular side of the incremental measuring graduation that faces away from the scanning unit.

It is possible that the imaging optics is arranged as a Fresnel lens.

Moreover, the diaphragm structure may have a plurality of subregions in which different deflection effects result on the ray bundles incident thereon, a detector element being situated downstream from the diaphragm structure in every resulting deflection direction.

In this context, the plurality of subregions of the diaphragm structure may either let the ray bundles incident thereon pass without deflection or bring about a defined spatial deflection with the aid of grating structures situated therein.

In addition, the scanning unit may include a scanning plate, on whose side facing away from the reflection measuring standard the diaphragm structure is situated, and on whose side facing the reflection measuring standard the imaging optics is situated.

It may also be provided that scanning devices for the incremental signal generation in the form of reflector elements and gratings are furthermore situated on the two sides of the scanning plate.

In addition, it is possible that the reference marking has multiple line-type structural elements, which are situated along the measurement direction and whose longitudinal direction has a parallel orientation with respect to the transversal direction, and at least a portion of the structural elements has a transversal periodicity along the transversal direction.

The structure elements may be arranged with a variable longitudinal periodicity along the measurement direction, the longitudinal periodicity varying in an identical manner on both sides starting from a central line of symmetry of the reference marking.

In addition, the reference marking may be arranged such that a ray bundle incident thereon is split up into at least two partial ray bundles diffracted in reflection, which have an identical orientation transversal to the measurement direction and a symmetrical orientation relative to one another in the measurement direction.

It may furthermore be provided to arrange the imaging optics such that the split-up partial ray bundles come to superposition again in the diaphragm plane with its aid and frequency-doubled imaging of the reference marking in the diaphragm plane results at the reference position.

The measuring graduation may be arranged as a binary reflection phase grating.

The scanning unit may have a light source for the incremental signal generation and for the reference signal generation in each case.

It may moreover be provided that the imaging optics is arranged such that it causes a deflection effect transversal to the measurement direction on the partial ray bundles incident thereon or causes focusing on the detector elements.

With the aid of the measures described herein, it is possible to provide not only the desired insensitivity to tilting but also a significant tolerance of the system with regard to fluctuations of the scanning distance. Faulty position measurements caused by faulty referencing are able to be avoided in the optical position-measurement device described herein. Even during a possibly required restart, it is provided that correct absolute position values are determined and output at all times after the referencing.

Further features and aspects of example embodiments of the present invention are described in further detail below with reference to the appended Figures.

BRIEF DESCRIPTION OF THE DRAWINGS

FIG. 1a is a first cross-sectional view of an optical position-measurement device according to an example embodiment of the present invention.

FIG. 6b illustrates a plurality of further-processed signals that are formed from the signals illustrated in FIG. 6a.

DETAILED DESCRIPTION

An optical position-measurement device according to an example embodiment of the present invention, and, in particular, the generation of a reference signal RI, are described in more detail below with reference to FIGS. 1a to 7.

Figure 1B:
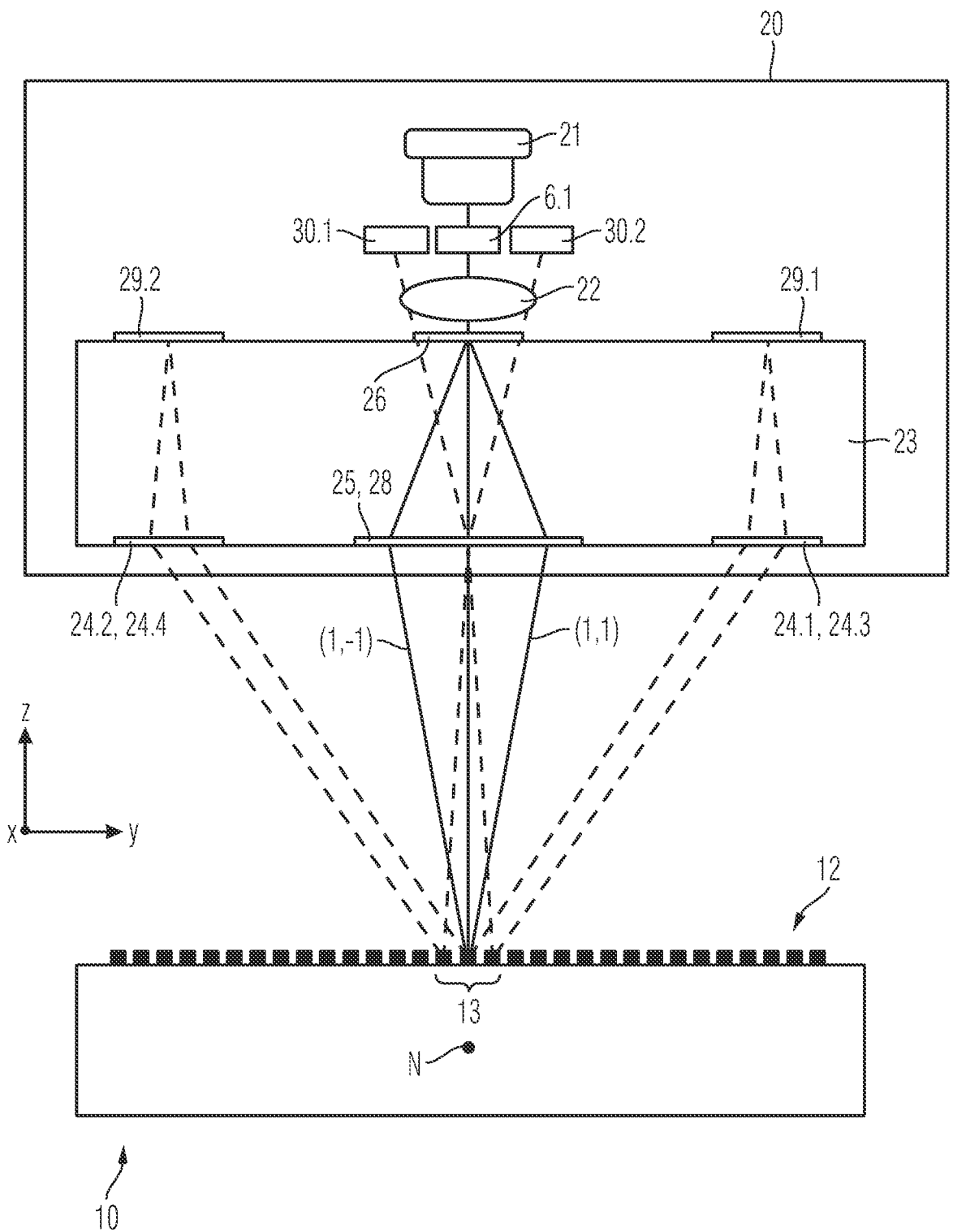
FIG. 1b is a second cross-sectional view of the optical position-measurement device.

FIGS. 1a and 1b illustrate partial scanning optical paths for the incremental and reference signal generation in a position-measurement device according to an example embodiment of the present invention in different views and in highly schematic form. FIGS. 2 to 4b are views or partial views of a reflection measuring standard, imaging optics, a diaphragm structure, and an underside and a topside of the scanning plate provided in this example embodiment.

The optical position-measurement device includes a reflection measuring standard 10 and a scanning unit 20, which is movable relative to reflection measuring standard 10 in at least one measurement direction x. Reflection measuring standard 10 and scanning unit 20 are connected to two objects, such as machine components, which are movable relative to one another. Position signals with regard to the position of the two objects movable relative to one another are generated via the position-measurement device and conveyed to a control unit. The control unit uses the position data for control purposes. The optical position-measurement device may include a linear measuring standard for the detection of linear displacement movements. In addition, it is possible to provide a corresponding rotatory position-measurement device with a circular measuring standard for the acquisition of rotatory relative movements.

As described below, in addition to periodic incremental signals $INC_A$, $INC_B$, the position-measurement device also supplies a plurality of signals $S_{-1}$, $S_0$, $S_1$, which are further processed into a reference signal RI in at least one known reference position $x_{REF}$ along the measuring track. The incremental measurement, which has a considerably higher resolution, is subsequently able to be related in, e.g., a conventional manner, to the absolute position determined in this manner at reference position $x_{REF}$. The further processing of the reference signal and the incremental signals into a high-resolution, absolute position signal may be performed both in the position-measurement device and in a downstream subsequent electronics or control unit.

Reflection measuring standard 10 includes an incremental measuring graduation 12, which is arranged on a scale carrier 11 and extends in measurement direction x. Reference marking 13 is provided in an integrated fashion in at least one defined reference position $x_{REF}$ in incremental measuring graduation 12. It is also possible to place multiple reference markings at different reference positions, e.g., in the form of so-called distance-encoded reference markings, etc.

Figure 2:
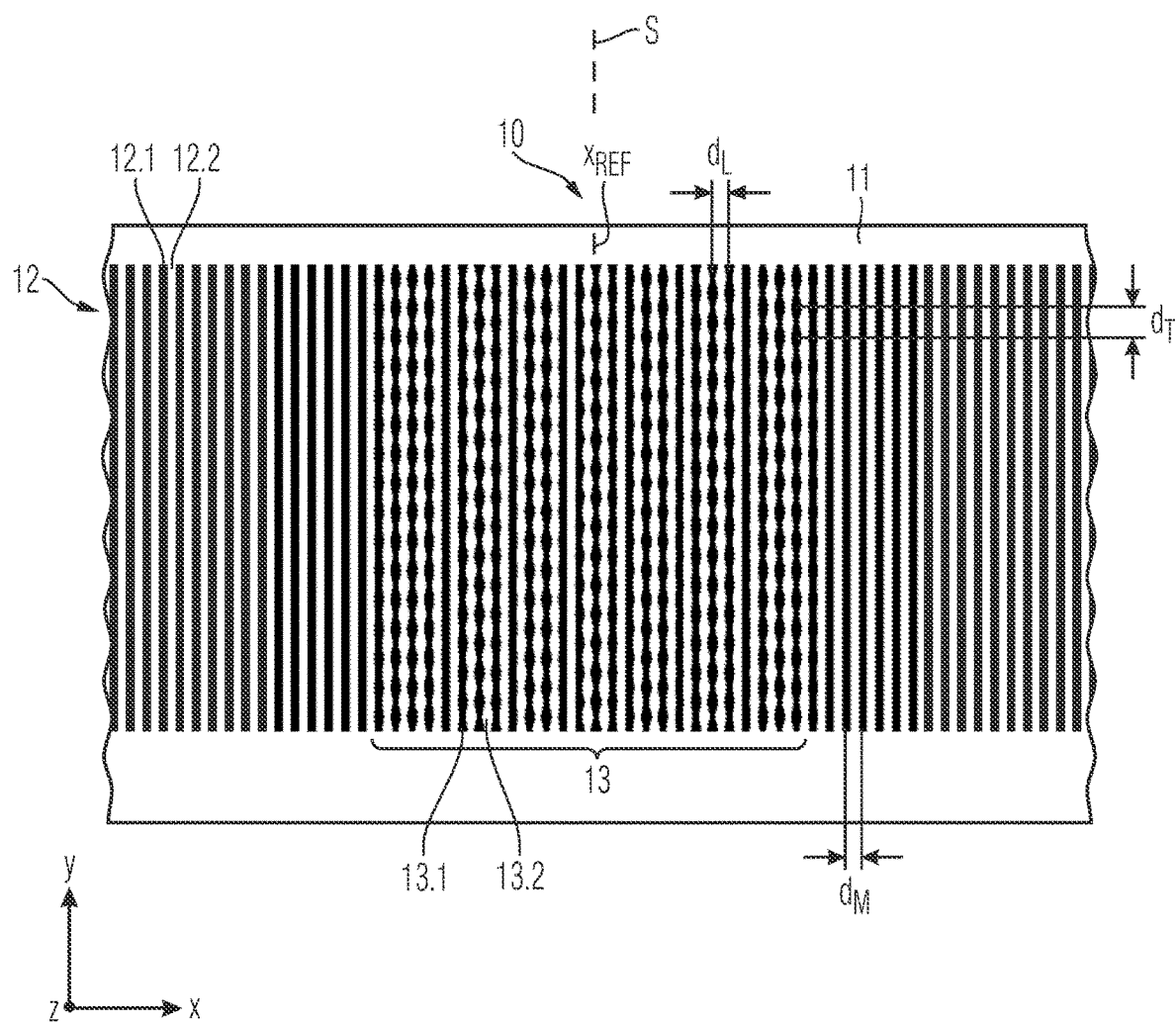
FIG. 2 is a partial top view of a reflection measuring standard of the optical position-measurement device.

In the illustrated example embodiment, incremental measuring graduation 12 is arranged as a binary reflection phase grating and includes line-type graduation regions 12.1, 12.2 periodically arranged in measurement direction x with at the incremental graduation period $d_M$. In FIG. 2, the various graduation regions 12.1, 12.2 are indicated in light and dark form and have different phase-shifting effects on the reflected ray bundles. The incremental graduation period of the incremental measuring graduation may be selected according to $d_M$=2 μm. Graduation regions 12.1, 12.2 extend perpendicular to measurement direction x in the plane of reflection measuring standard 10, i.e., in the indicated y direction, which is also referred to below as transversal direction y.

Reference marking 13 integrated into incremental measuring graduation 12 includes multiple groups of structural elements 13.1, 13.2 having a periodic transversal structure, which are also indicated in light and dark form in FIG. 2 and exert different phase-shifting effects on the reflected ray bundles. Periodically positioned graduation regions 12.1, 12.2 are arranged between the groups including structural elements 13.1, 13.2.

Structural elements 13.1, 13.2 of reference marking 13 are arranged one after the other along measurement direction x, the longitudinal direction of structure elements 13.1, 13.2 extending perpendicular to measurement direction x in the measuring graduation plane, e.g., also along transversal direction y. Reference marking 13 is arranged as a so-called a chirp reference marking. This means that a placement of structural elements 13.1, 13.2 of reference marking 13 along measurement direction x is provided with a variable reference marking longitudinal periodicity $d_L$. Reference marking longitudinal periodicity $d_L$ changes on both sides in an identical manner starting from a central line of symmetry S of reference marking 13, or in other words, the longitudinal periodicity $d_L$ of structural elements 13.1, 13.2 increases in the outward direction. The only very slight variation of reference marking longitudinal periodicity $d_L$ is not visible in FIG. 2.

Along transversal direction y, structural elements 13.1, 13.2 have a reference marking transversal periodicity $d_T$. More specifically, structural elements 13.1, 13.2 have a periodic contour along transversal direction y, e.g., a periodic boundary contour, featuring the corresponding reference marking transversal periodicity $d_T$.

With the aid of such an arrangement of reference marking 13, a ray bundle incident thereon in a perpendicular fashion is split into at least two partial beam bundles diffracted in reflection, which are denoted by (1, 1) and (1, −1) in the Figures. On the one hand, these partial ray bundles (1, 1), (1, −1) have an identical orientation transversally to measurement direction x, i.e., are identically tilted in the yz-plane, and on the other hand, they have a symmetrical orientation with respect to one another in measurement direction x, i.e., are symmetrically aligned in the xz-plane relative to the direction of incidence. This will be further described in connection with the description of the partial scanning optical path for the reference signal generation.

Figure 4A:
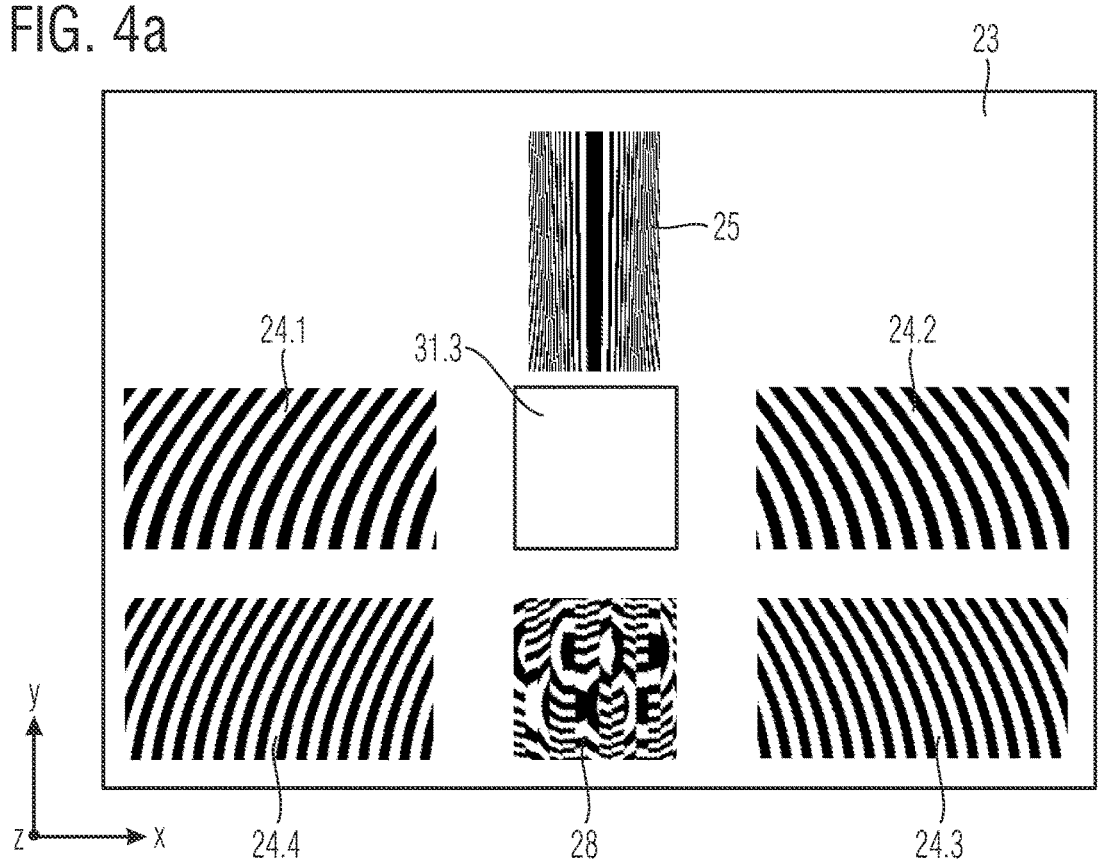
FIG. 4a is a plan view of the underside of a scanning plate of the optical position-measurement device.
Figure 4B:
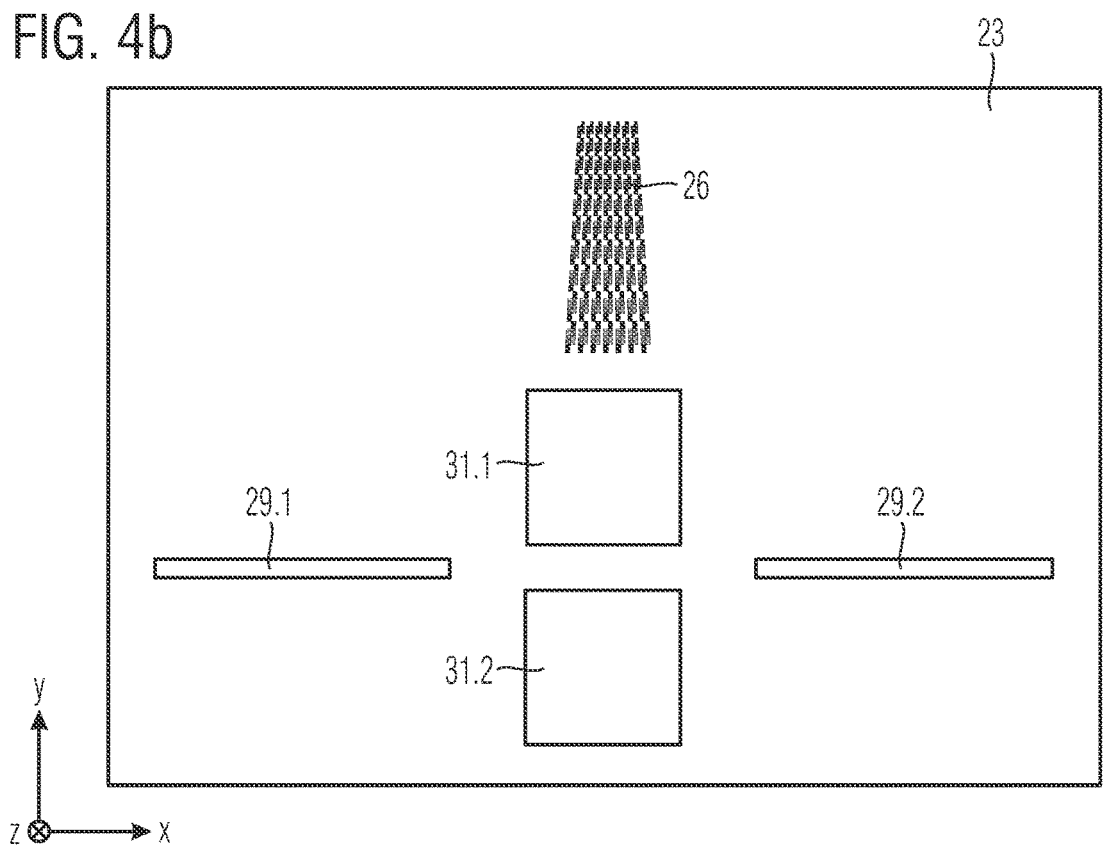
FIG. 4b is a plan view of the topside of the scanning plate of the optical position-measurement device.

On the one hand, scanning device(s) for generating incremental signals $INC_A$, $INC_B$ are provided on the side of scanning unit 20, and on the other hand, a light source 21, imaging optics 25, a diaphragm structure 26, and a plurality of detector elements 27.1, 27.2, 27.3 are used for the reference signal generation. Imaging optics 25 and diaphragm structure 26 are arranged on the opposite sides of a transparent scanning plate 23 in scanning unit 20, scanning plate 23 being arranged as a thin glass plate. The side of scanning plate 23 facing reflection measuring standard 10 is also referred to as the underside of the scanning plate, and the opposite side in the z-direction is referred to as the topside. Views of the underside and the topside of the scanning plate are illustrated in FIGS. 4a and 4b.

In the illustrated example embodiment, a laser diode downstream from a collimation optics 22 serves as light source 21. In this instance, a jointly used light source 21 is provided both for the generation of incremental signals $INC_A$, $INC_B$ and for the generation of signals $S_{-1}$, $S_0$, $S_1$ from which reference signal RI is generated.

Apart from light source 21 and a plurality of detector elements 30.1, 30.2, further optical elements in the form of gratings 24.1 to 24.4, 28 and reflector elements 29.1, 29.2, which are arranged on the topside and underside of scanning plate 23, are among the scanning devices for the incremental signal generation. The partial scanning optical path for generating the incremental signals is indicated by dashed lines in the Figures. After passing through scanning plate 23, the ray bundle emitted by light source 21 is split into reflected partial ray bundles in the xz-plane after impinging upon incremental measuring graduation 12 as illustrated in FIG. 1b, whereupon they pass through gratings 24.1, 24.2 in scanning plate 23, impinge upon reflector elements 29.1, 29.2 and are reflected from there again in the direction of gratings 24.3, 24.4 and incremental measuring graduation 12. From there, the partial ray bundles are reflected a second time and brought to superposition on grating 28 in scanning plate 23. From grating 28, interfering pairs of partial ray bundles propagate in the direction of detector elements 30.1, 30.2, via which the phase-shifted incremental signals $INC_A$, $INC_B$ are generated.

The partial scanning optical path for generating reference signal RI is described in more detail below. The corresponding partial scanning optical path is indicated by solid lines in each case in FIGS. 1a and 1b.

The ray bundle emitted by light source 21 and aligned in parallel via collimation optics 22 passes through scanning plate 23 without deflection and impinges upon measuring standard 10 in a perpendicular fashion at reference position $x_{REF}$ in the region of reference marking 13. Via reference marking 13 arranged as described above, the incident ray bundle is split into at least two partial ray bundles (1, 1) and (1, −1) diffracted in reflection, which have the previously described orientation. FIG. 1a illustrates the identical tilting of the two reflected partial ray bundles (1, 1) and (1, −1) in the yz-plane, while FIG. 1b shows the symmetrical orientation of the partial ray bundles (1, 1), (1, −1) in measurement direction x in the xz plane. The split and reflected partial ray bundles (1, 1), (1, −1) impinge upon an imaging optics 25 in scanning unit 20, which is situated on the side of scanning plate 23 facing reflection measuring standard 10 and arranged as a Fresnel lens, for example. FIG. 4a illustrates the underside of scanning plate 23 with gratings 24.1 to 24.4, 28, imaging optics 25, and an optically neutral window region 31.3.

With the aid of imaging optics 25, the split partial ray bundles (1, 1), (1, −1) are brought to superposition in a diaphragm plane. Located in the diaphragm plane on the side of scanning plate 23 facing away from reflection measuring standard 10 is a diaphragm structure 26, which has a plurality of diaphragm openings. FIG. 4b illustrates the topside of scanning plate 23 with diaphragm structure 26, reflector elements 29.1, 29.2, and optically neutral window regions 31.1, 31.2. Imaging optics 25 of the position-measurement device is arranged such that frequency-doubled imaging of reference marking 13 results in the diaphragm plane when reference marking 13 is crossed. This means that the image-side focal plane of imaging optics 25 coincides with the topside of scanning plate 23 or the diaphragm plane located there. Further details in connection with the configuration of imaging optics 25 and diaphragm structure 26 are described below.

Figure 6A:
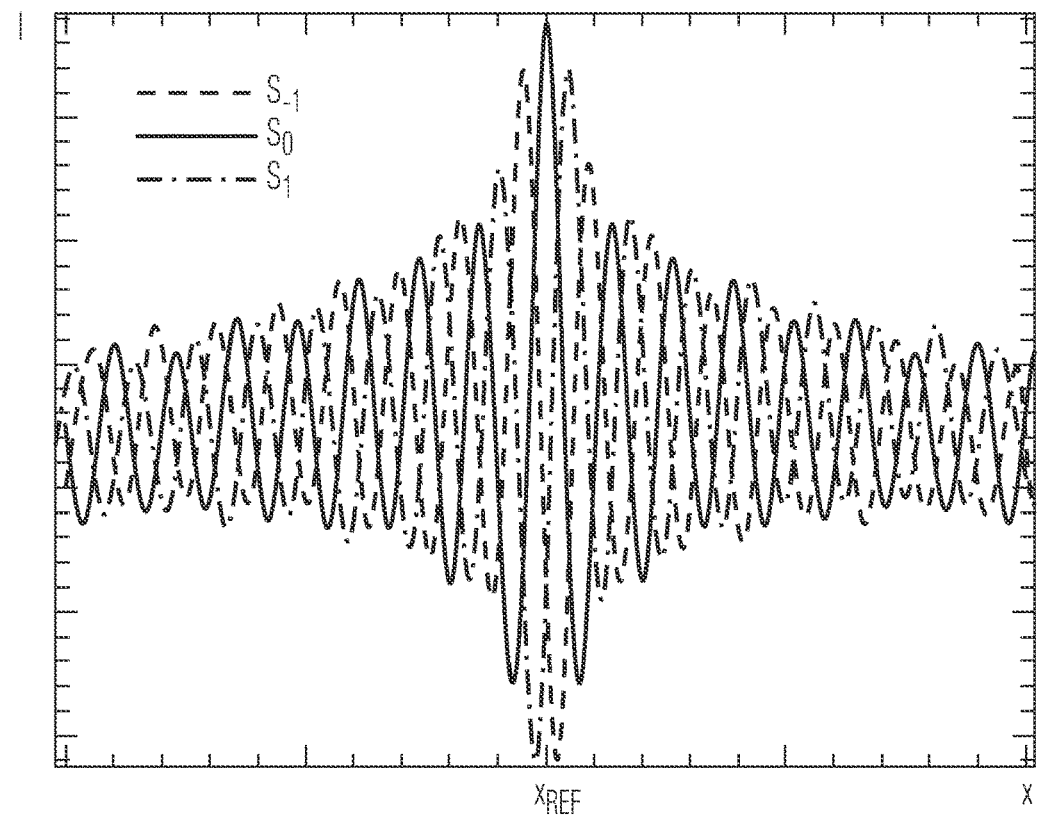
FIG. 6a illustrates resulting signals for a reference signal generation in the position-measurement device.

Arranged in scanning unit 20 downstream from diaphragm structure 26 are three detector elements 27.1 to 27.3, which are used for detecting the light transmitted through the diaphragm openings and thus for generating reference signal RI. Signals $S_{-1}$, $S_0$, and $S_1$ applied at detector elements 27.1 to 27.3 in the region of reference position $x_{REF}$ are illustrated in FIG. 6a. The manner in which the reference signal RI is able to be generated from these signals $S_{-1}$, $S_0$, and $S_1$ is described in greater detail below.

In order to provide the desired insensitivity of the optical position-measurement device to tilting events of scanning unit 20 and reflection measuring standard 10, the same behavior is provided regarding tilting of the scanning unit and the reflection measuring standard both for the generation of incremental signals $INC_A$, $INC_B$ and for the generation of reference signal RI. For this purpose, the so-called neutral pivot points coincide for both scans. As mentioned above, the neutral pivot point of the respective scan should be understood to be the particular point about which tilting of scanning unit 20 and reflection measuring standard 10 may occur without resulting in a position error.

In the illustrated example embodiment, the neutral pivot point N of the incremental scanning—as illustrated in FIGS. 1a and 1b—is located on the particular side of incremental measuring graduation 12 that faces away from scanning unit 20, that is to say, below the measuring graduation plane in scale carrier 11. In order to provide a common neutral pivot point with the reference signal generation, imaging optics 25 has a focal length on the object side that is located in the plane of neutral pivot point N of the incremental scanning. To furthermore make certain that the coinciding of the neutral pivot points of both scans is provided also in the presence of fluctuating scanning distances between measuring standard 10 and scanning unit 20, a further measure is provided with regard to imaging optics 25. For example, imaging optics 25 has an object-side variable focal length perpendicular to measurement direction x, i.e., along the already previously described transversal direction y.

Figure 5:
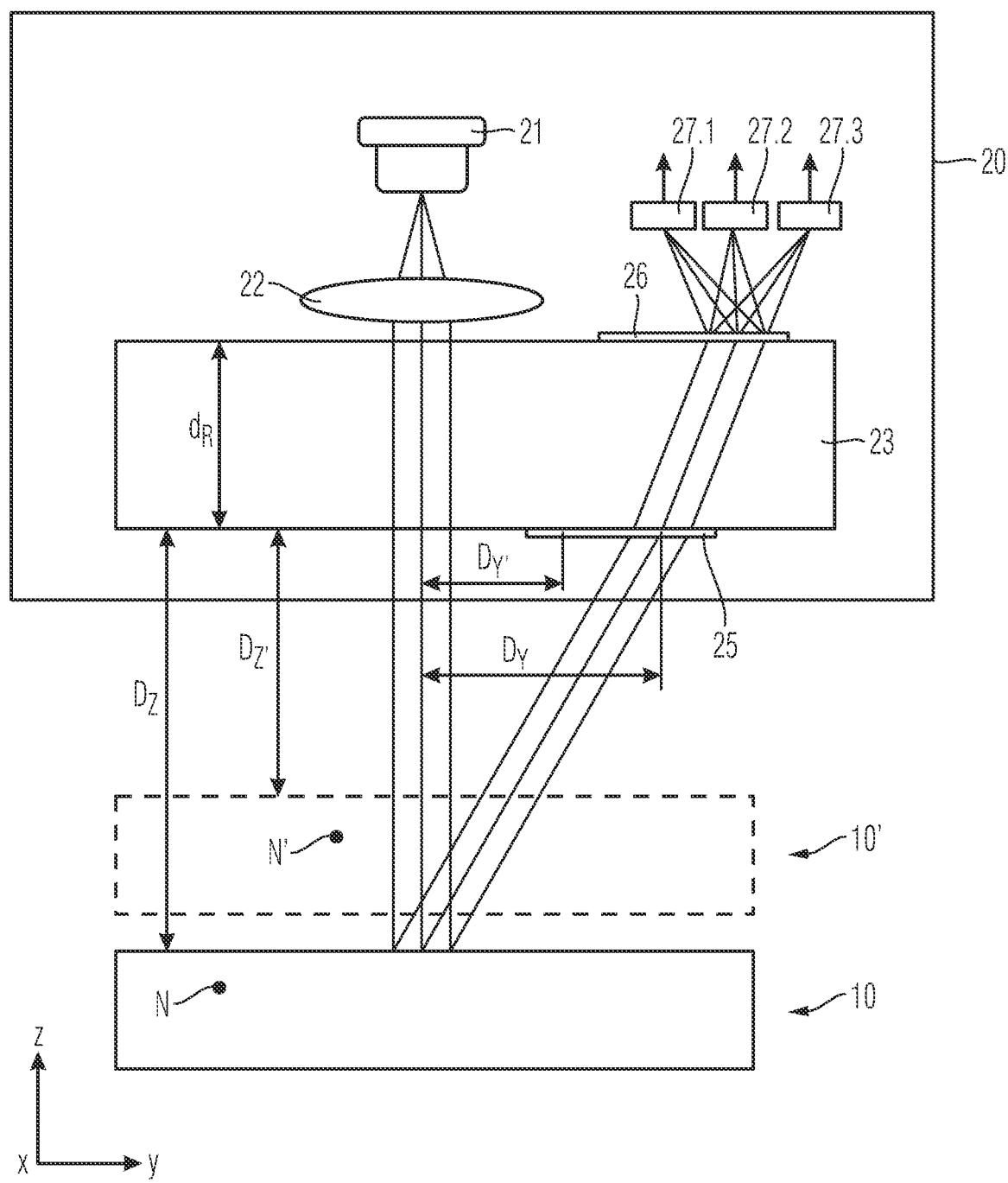
FIG. 5 further illustrates the position-measurement device in conjunction with different scanning distances.

With regard to the effect and the more detailed description of this measure, reference is made to FIG. 5, which illustrates the scanning optical path for the reference signal generation of the optical position-measurement device in the case of two different scanning distances $D_Z$ and $D_{Z'}$. If the larger scanning distance $D_Z$ changes in the direction of a smaller scanning distance $D_{Z'}$, then the position of neutral pivot point N in scanning plate 23 changes as well, as illustrated in FIG. 5. As illustrated, neutral pivot point N' shifts slightly to the right in this case. In order to furthermore provide that neutral pivot point N' is located in the object-side focal length of imaging optics 25 also at scanning distance $D_{Z'}$, imaging optics 24 has an object-side focal length that varies along transversal direction y. In the illustrated example, for instance, the object-side focal length of imaging optics 25 at distance $D_Y$ (corresponding to greater scanning distance $D_Z$) from the incident ray bundle is greater than at distance $D_{Y'}$ (corresponding to smaller scanning distance $D_{Y'}$). A defined distance $D_Y$, $D_{Y'}$ thus exists for every possible scanning distance $D_Z$, $D_Y$ with regard to the impingement point of the main ray of the partial ray bundle in the plane of imaging optics 25. Depending on distance $D_Y$, an object-side focal length of imaging optics 25 is provided that varies in transversal direction y, and is adapted to scanning distance $D_Z$ associated with each distance $D_Y$.

Figure 3A:
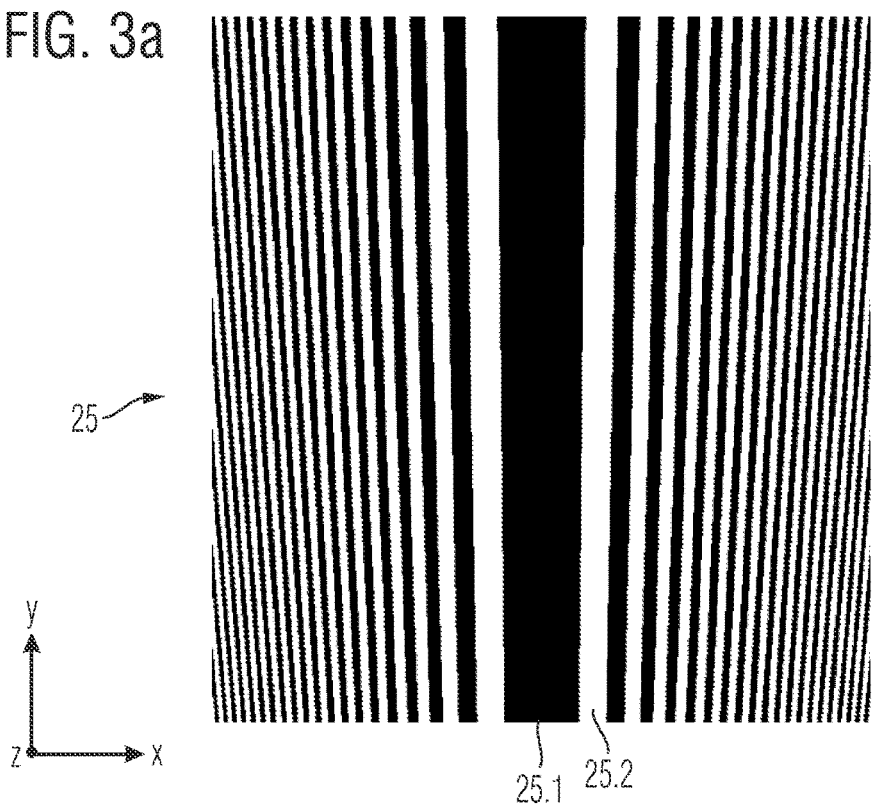
FIG. 3a is an enlarged view of imaging optics of the optical position-measurement device.

FIG. 3a is an enlarged view of a correspondingly configured imaging optics 25, which is arranged as a diffractive structure in the form of a Fresnel lens. Along transversal direction y, the spacing of adjacent grating lines 25.1, 25.2 of the diffractive structure becomes slightly larger along line direction y from below to above. This results in the desired change of the object-side focal length of imaging optics 25 along transversal direction y.

Figure 3B:
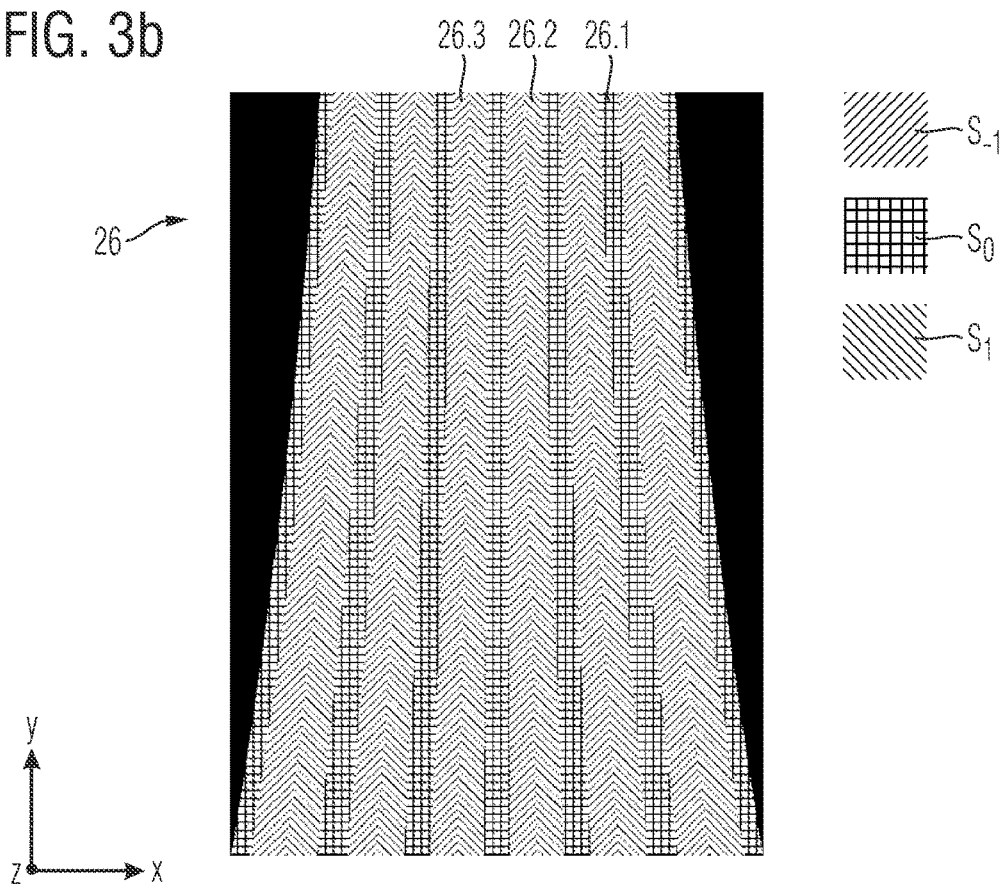
FIG. 3b is an enlarged view of a diaphragm structure of the optical position-measurement device.

When reference marking 13 is crossed, an intensity pattern in the form of a frequency-doubled image of reference marking 13 results in the diaphragm plane via imaging optics 25. Diaphragm structure 26 situated there and illustrated in more detail in FIG. 3b, is adapted to the image of reference marking 13 resulting in the diaphragm plane and has a plurality of subregions 26.1, 26.2, 26.3 where different spatial deflection effects result for the ray bundles incident thereon. A defined deflection direction thus exists for each subregion 26.1, 26.2, 26.3 of diaphragm structure 26. In the respective deflection direction, an optoelectronic detector element 27.1, 27.2, 27.3 is arranged downstream from diaphragm structure 26. In the illustrated example embodiment, a diaphragm structure 26 having three differently configured, stripe-type subregions 26.1 to 26.3 is provided, which is illustrated in FIG. 3b with different cross-hatching. The various subregions 26.1 to 26.3 are periodically arranged with multiple repetitions along measurement direction x. A first subregion 26.1 is provided in completely transparent form and allows ray bundles incident thereon to pass through without deflection. Signal $S_0$ results from this subregion 26.1 on downstream detector 27.1. A second subregion 26.2 of diaphragm structure 26 has a first grating, which deflects the incident light in the direction of downstream detector 27.2 where signal $S_1$ results. A second grating is provided in a third subregion 26.3, which deflects incident light in the direction of downstream detector 27.3 where signal $S_{-1}$ results. Thus, deflection effects of the ray bundles passing through these subregions 26.2, 26.3 are present to the right and left in subregions 26.2, 26.3 in the drawing plane of FIG. 1a. The different structures provided in subregions 26.2, 26.3 in the Figures do not represent the gratings located there in each case but are merely meant to schematically illustrate the presence of differently configured subregions in diaphragm structure 26.

When reference marking 13 is crossed, the signals $S_{-1}$, $S_0$, and $S_1$, from which reference signal RI is obtained, result at the detector elements 27.1 to 27.3 arranged in the different deflection directions. Because of the coinciding of the image intensity pattern with subregions 26.1, 26.2, 26.3, the frequency-doubled image of reference marking 13 moving in the diaphragm plane supplies a maximum of signal $S_0$ exactly at reference position $x_{REF}$, as well as minima of signals $S_1$, $S_{-1}$. The corresponding characteristic of oscillating, phase-shifted signals $S_0$, $S_{-1}$, $S_1$ in the region of reference position $x_{REF}$ is illustrated in FIG. 6a.

Figure 7:
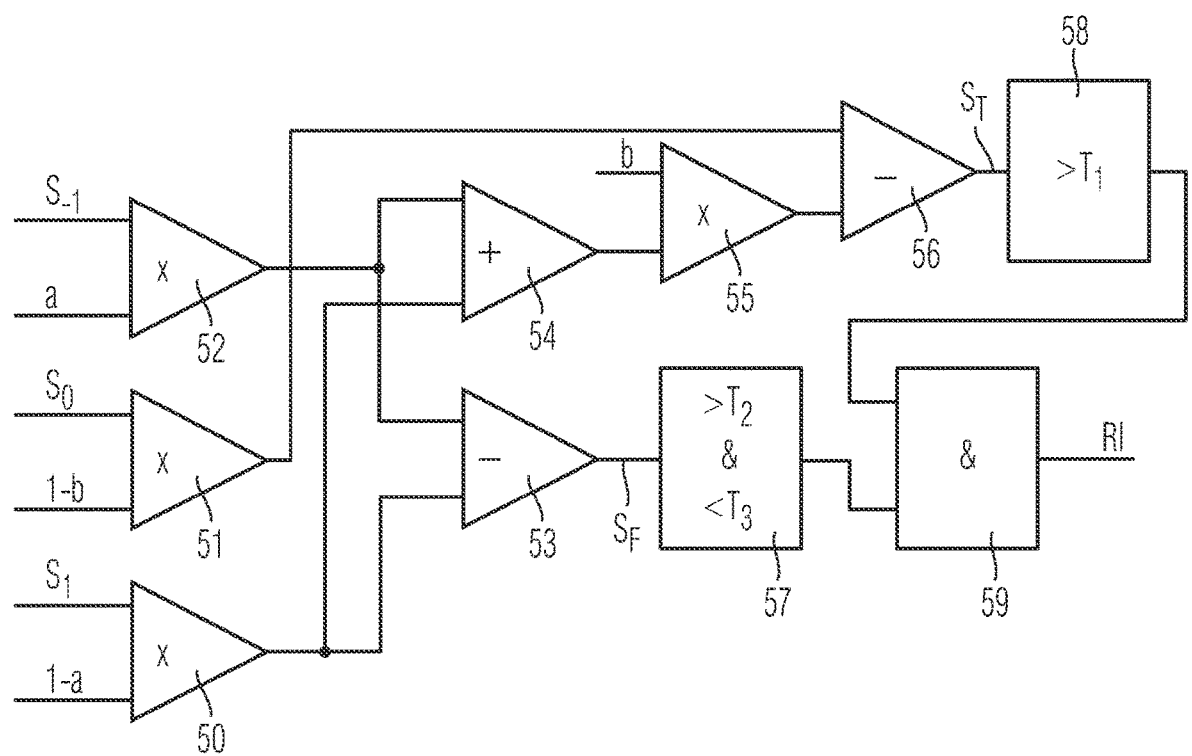
FIG. 7 is a block diagram illustrating a circuit system for processing the different signals and for generating the reference signal illustrated in FIGS. 6a and 6b.

The further processing of the thereby obtained signals $S_0$, $S_{-1}$, $S_1$ into reference signal RI takes place with the aid of the circuit system illustrated in FIG. 7. Via the wiring and positioning of the electronic elements in the form of amplifiers 50 to 52, 55 having an adjustable amplification, a summer 54 and two subtractors 53, 56, a gate signal $S_T$, and an edge signal $S_F$ are first generated from signals $S_0$, $S_{-1}$, $S_1$ according to the following relationship:

$$\begin{pmatrix} S_T \\ S_F \end{pmatrix}(x) = \begin{pmatrix} (a-1)b & 1-b & -ab \\ 1-a & 0 & -a \end{pmatrix} \begin{pmatrix} S_{-1} \\ S_0 \\ S_1 \end{pmatrix}(x)$$

Figure 6B:
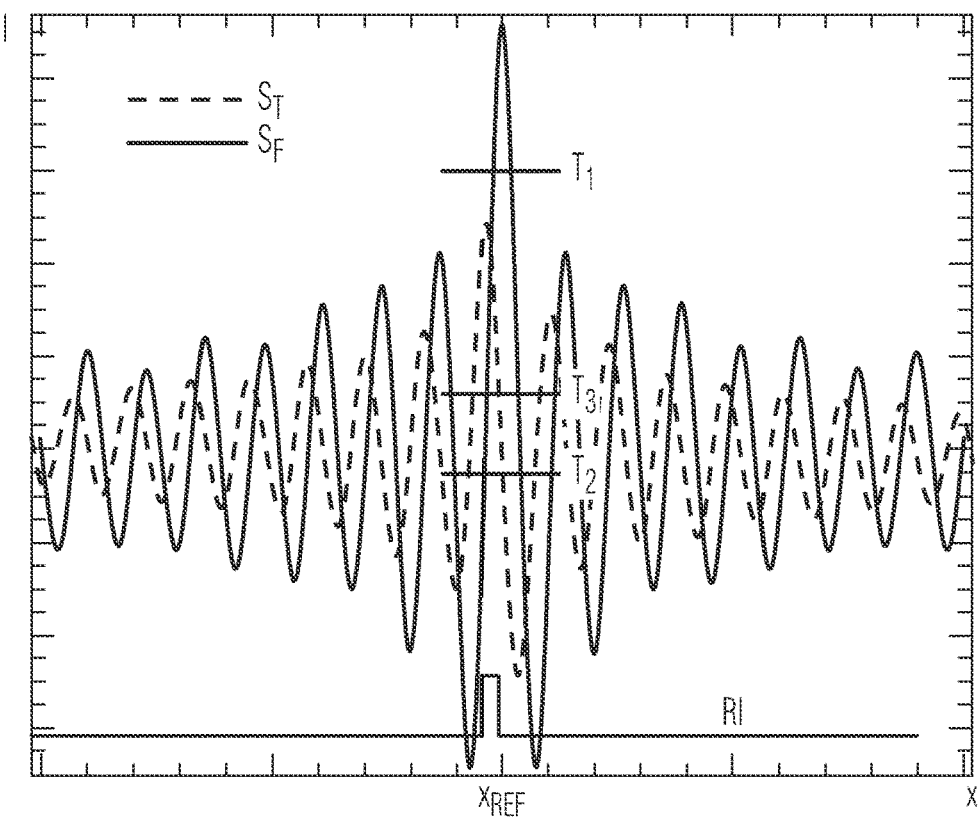

The characteristic of the thereby generated signals $S_T$, $S_F$ in the region of reference position $x_{REF}$ is illustrated in FIG. 6b.

Gate signal $S_T$ is supplied to a comparator 58 at whose second input trigger threshold $T_1$ is applied, and an output signal is generated only if gate signal $S_T$ is greater than trigger threshold $T_1$. Edge signal $S_F$ supplied to a further comparator 57, in which two trigger thresholds $T_2$, $T_3$ are set so that an output signal results only if edge signal $S_F$ is between these two trigger thresholds $T_2$, $T_3$. The corresponding output signals of the two comparators 58, 59 are supplied to an AND device 59, which generates the desired square-wave reference signal RI from the logic AND operation.

In addition to the above-described example embodiment, there are further configurations within the spirit and scope hereof.

Figure 8A:
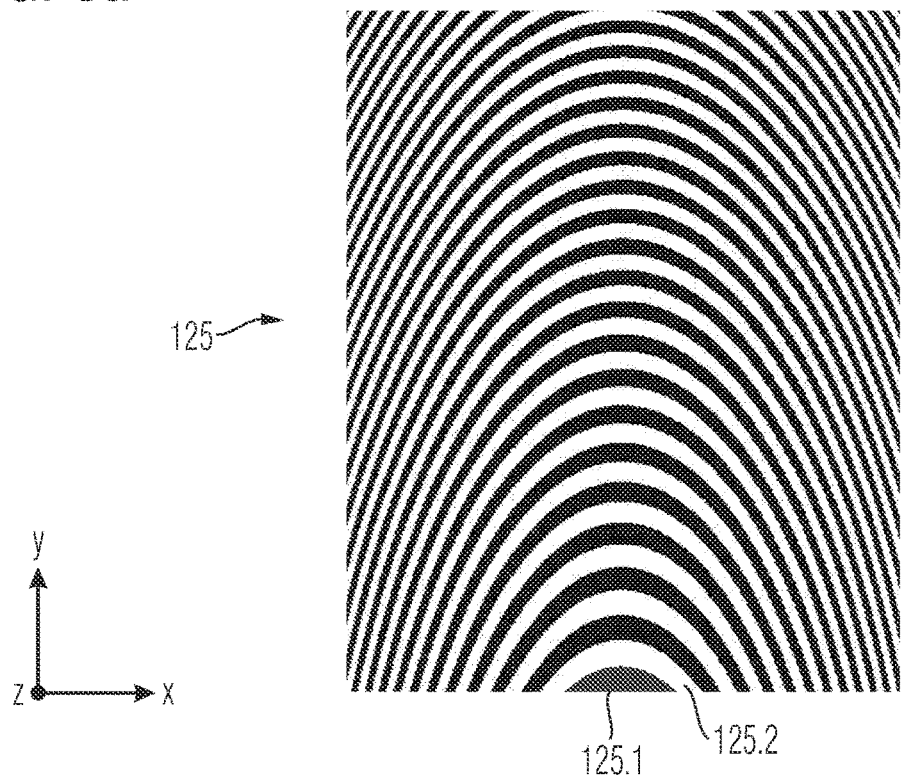
FIGS. 8a and 8b are enlarged views of the imaging optics of optical position-measurement devices according to further example embodiments of the present invention.

For example, it is possible to integrate additional optical functionalities into the imaging optics. For example, the imaging optics may be adapted to cause a transversal deflection effect on the partial ray bundles incident thereon from the direction of the reference marking. In this manner, for example, the propagation direction of the corresponding partial ray bundles perpendicular to measurement direction x is able to be modified. In FIG. 1a, this would mean a deflection of the partial ray bundles incident on the imaging optics to the left in the yz-plane, in the direction of a normal to the imaging optics. A top view of a correspondingly configured imaging optics 125 is illustrated in FIG. 8a. The transversal periodicity of grating lines 125.1, 125.2 is constant along transversal direction y.

Figure 8B:
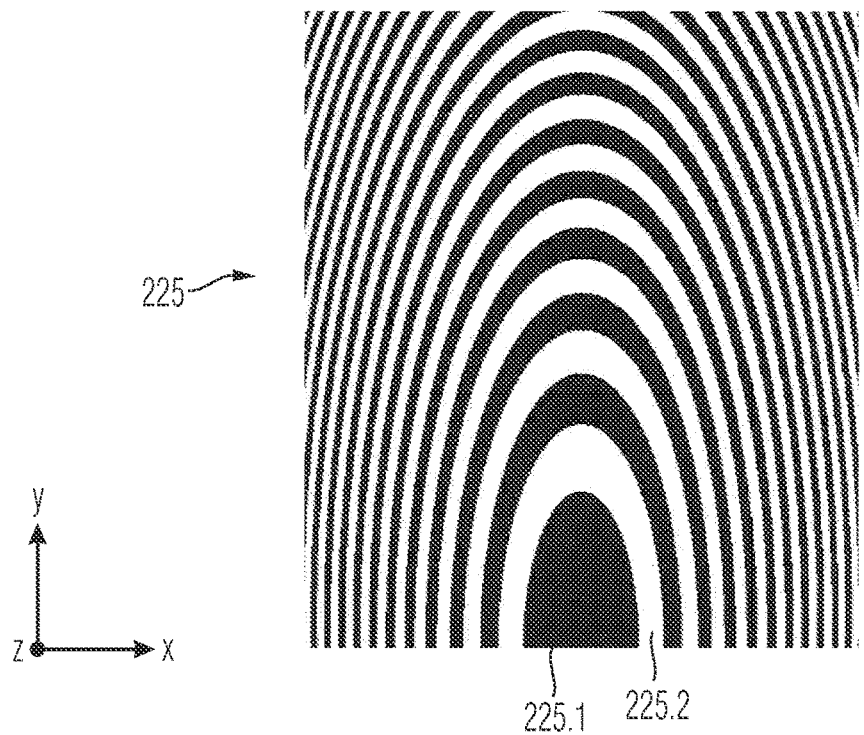

In addition, it may be provided that focusing of the partial ray bundles incident on the imaging optics on the downstream detector elements takes place via the imaging optics. Such imaging optics 225 is illustrated in FIG. 8b. In this instance, imaging optics 225 has a variable transversal periodicity of grating lines 225.1, 225.2 along transversal direction y.

Moreover, instead of the above-described shared use of a light source for the incremental signal generation and the reference signal generation, in the optical position-measurement device \, it may be provided that the scanning unit has a light source for the incremental signal generation and for the reference signal generation in each case.

With regard to the configuration of the diaphragm structure used for the reference signal generation, it is possible that all subregions of the diaphragm structure include deflecting gratings, which cause a deflection into a defined direction in space in each case.

The grating structures arranged in the various subregions may additionally also be configured such that not only a defined spatial deflection effect results but focusing in the respective detection plane of the allocated detector element takes place in addition. In this manner, additional focusing optics between the diaphragm structure and the detector elements are able to be avoided. For example, the subregions of the diaphragm structure may be provided with corresponding diffractive cylinder lenses for this purpose.

It is furthermore also possible that the neutral pivot point of the incremental scanning does not lie below the measuring graduation plane as in the above-described example embodiment, but is arranged above the measuring graduation plane. It should then be similarly provided by the appropriate selection of an object-side focal length of the imaging optics that the neutral pivot point of the reference signal generation also comes to lie in this plane, etc.

What is claimed is:

1. An optical position-measurement device, comprising:
    a reflection measuring standard including an incremental measuring graduation and a reference marking in at least one reference position; and
    a scanning unit movable relative to the reflection measuring standard in at least one measurement direction and including a scanning device adapted to generate incremental signals and, adapted to generate reference signals, at least one light source, imaging optics, a diaphragm structure arranged in a diaphragm plane, and a plurality of detector elements, the imaging optics adapted to image the reference marking onto the diaphragm structure;
    wherein the reference marking is arranged on the reflection measuring standard and is integrated into the incremental measuring graduation; and
    wherein the imaging optics includes a variable object-side focal length along a transversal direction that is oriented perpendicular to the measurement direction.

2. The optical position-measurement device according to claim 1, wherein the object-side focal length is located in a plane of a neutral pivot point of incremental scanning for each scanning distance between the scanning unit and the reflection measuring standard, the neutral pivot point corresponding to a particular point about which tilting of the scanning unit or the reflection measuring standard is possible without resulting in a position error in the generated incremental signals.

3. The optical position-measurement device according to claim 2, wherein the neutral pivot point in the reflection measuring standard is located on a side of the incremental measuring graduation that faces away from the scanning unit.

4. The optical position-measurement device according to claim 1, wherein the imaging optics includes a Fresnel lens.

5. The optical position-measurement device according to claim 1, wherein the diaphragm structure includes a plurality of subregions where different deflection effects result on ray bundles incident thereon, a respective one of the detector elements being arranged downstream from the diaphragm structure in each resulting deflection direction.

6. The optical position-measurement device according to claim 5, wherein the plurality of subregions of the diaphragm structure are adapted to pass incident ray bundles without deflection or cause a defined spatial deflection by grating structures.

7. The optical position-measurement device according to claim 1, wherein the scanning unit includes a scanning plate, the diaphragm structure being provided on a side of the scanning plate facing away from the reflection measuring standard, the imaging optics being provided on a side of the scanning plate facing the reflection measuring standard.

8. The optical position-measurement device according to claim 7, wherein the scanning device adapted to generate incremental signals includes reflector elements and gratings—provided on the two sides of the scanning plate.

9. The optical position-measurement device according to claim 1, wherein the reference marking includes a plurality of line-type structural elements arranged along the measurement direction and having a longitudinal direction oriented parallel with respect to the transversal direction, at least a portion of the structural elements having a transversal periodicity in the transversal direction.

10. The optical position-measurement device according to claim 9, wherein the structural elements are positioned with a variable longitudinal periodicity along the measurement direction, the longitudinal periodicity varying in an identical manner on both sides starting from a central line of symmetry of the reference marking.

11. The optical position-measurement device according to claim 9, wherein the reference marking is adapted to split an incident ray bundle into at least two partial ray bundles, diffracted in reflection, having an identical orientation transversal to the measurement direction and having a symmetrical orientation relative to one another in the measurement direction.

12. The optical position-measurement device according to claim 11, wherein the imaging optics is adapted to superpose the partial ray bundles in the diaphragm plane so that frequency-doubled imaging of the reference marking in the diaphragm plane results at the reference position.

13. The optical position-measurement device according to claim 1, wherein the measuring graduation includes a binary reflection phase grating.

14. The optical position-measurement device according to claim 1, wherein the measuring graduation is arranged as a binary reflection phase grating.

15. The optical position-measurement device according to claim 1, wherein the scanning unit include a light source for each of the incremental signal generation and the reference signal generation.

16. The optical position-measurement device according to claim 1, wherein the imaging optics is adapted to cause a deflection effect transversal to the measurement direction on incident partial ray bundles.

17. The optical position-measurement device according to claim 1, wherein the imaging optics is adapted to cause focusing on the detector elements.

* * * * *